C. TOLMIE.
ATTACHMENT TO TUBE-WELDING FURNACES.
No. 187,937. Patented Feb. 27, 1877.
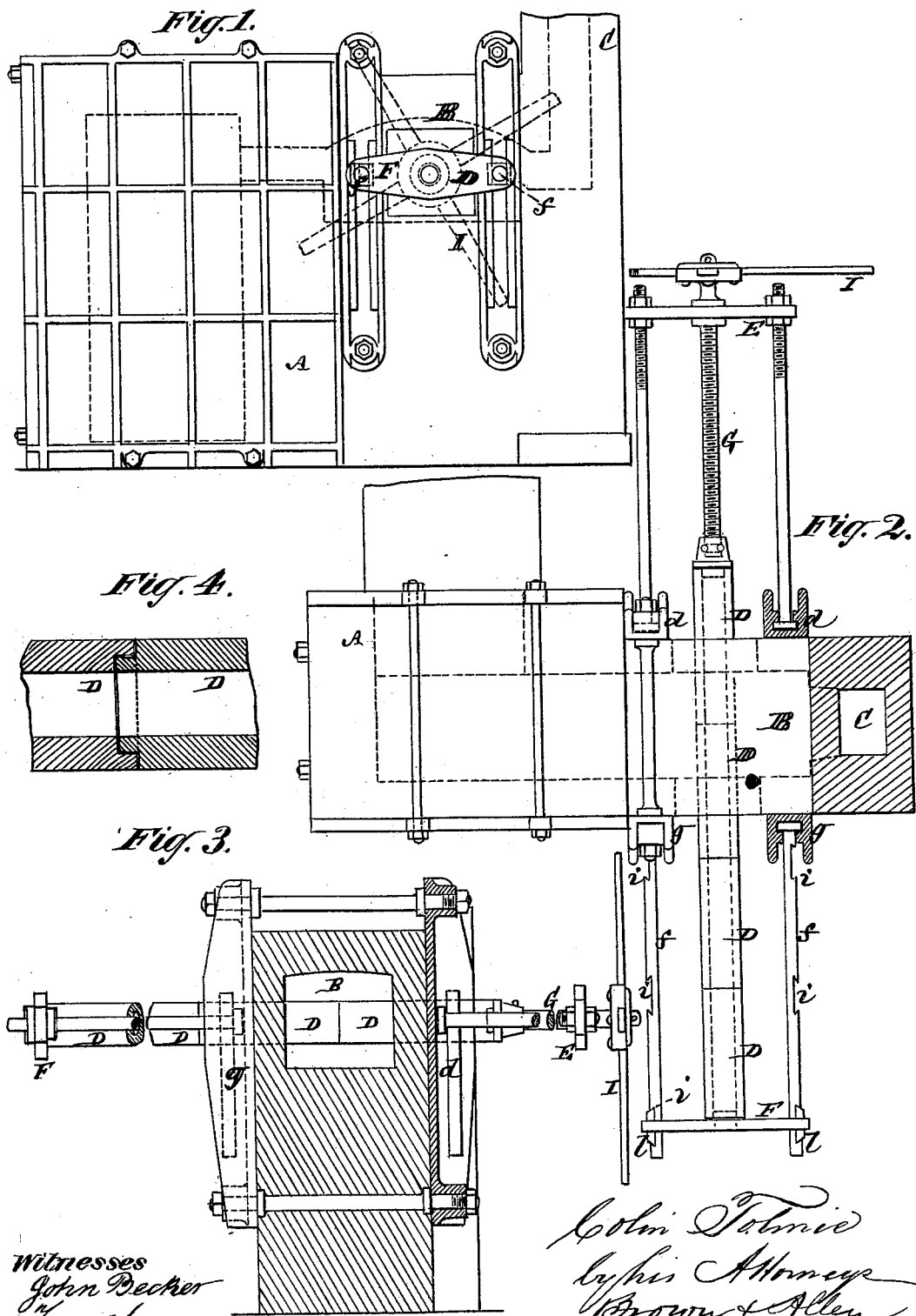

UNITED STATES PATENT OFFICE.

COLIN TOLMIE, OF COLD SPRING, NEW YORK, ASSIGNOR TO ROBERT P. PARROTT, OF SAME PLACE.

IMPROVEMENT IN ATTACHMENTS TO TUBE-WELDING FURNACES.

Specification forming part of Letters Patent No. 187,937, dated February 27, 1877; application filed August 25, 1876.

*To all whom it may concern:*

Be it known that I, COLIN TOLMIE, of Cold Spring, in the county of Putnam and State of New York, have invented a new and useful Improvement in Attachments to Furnaces for Welding Tubes Together and other Purposes; and I do hereby declare that the following is a full, clear, and exact description of the same, reference being had to the accompanying drawing, which forms part of this specification.

This invention is more particularly designed to be applied to the welding of sections of metal tubes together, and more especially to welding together the sections of steel or iron lining-tubes of ordnance, to which purpose the invention will here be restricted in the following description.

The object of the invention is to weld the sections or tubes together while the same are in the furnace, which brings them to the necessary heat for welding purposes.

The invention consists in certain novel constructions and combinations of parts used in said welding apparatus or attachment to the furnace, whereby increased facility is afforded for doing the required work.

Figure 1 represents a side elevation of a furnace with a welding attachment, suitable for welding together the sections of steel or iron lining-tubes for ordnance, applied. Fig. 2 is a plan of the same; and Fig. 3, an elevation thereof, looking toward the end of the furnace from its chimney side. Fig. 4 is a longitudinal section, upon a somewhat larger scale, of two of the sections of tubes, in part illustrated in the other figures of the drawing as united together by welding.

A is the main body of the furnace; B, its reverberatory chamber, and C the chimney thereof. Said furnace is or may be substantially similar to other reverberatory furnaces now in use for bringing tubes or other bodies to the necessary heat for welding purposes. It is provided, however, on opposite sides of its chamber B with openings and doors or lids, suitably luted, and formed with apertures through them, for the passage, in an approximately close-fitting manner, of the sections of tubes D D, through the sides of the furnace or its chamber B, and so that the meeting ends of the sections or tubes to be welded together are exposed to the action of the flame in the chamber B, while the outer or opposite ends of the same sections or tubes are outside of the furnace. The tubes or tubular sections D D are constructed at their ends with annular projections and recesses, as shown in Fig. 4, in order that they may fit one within the other. To unite said tubes by welding, they are first brought or fitted together at their ends, and afterward heated and pressed together while in the furnace. In order to do this, the internally-recessed end of either one tube is first warmed and expanded, and then put on or over the annular projection at the end of another tube, and shrunk thereon. This, however, is only preparatory to the welding, which is done in the same furnace as is required to bring the parts to the necessary welding-heat.

The compressing devices by which the welding is effected are substantially as follows: On the one side of the furnace, opposite the apertures through which the sections of tubes D are projected, is a frame, E, composed of an outer cross-bar and rods, which latter project laterally outward, and are connected with the side of the furnace by heads fitting within vertical guides *d*, up the sides of the furnace. This frame E carries a compressing or welding screw, G, the outer end of which works through the outer cross-bar of the frame E as a box, and the inner end of which is fitted with a cap, that closes and receives over it the outer end of one tube or section, D, which is to be united by welding with the inner end of an adjacent tube or section, fitted together as hereinbefore described, and with their meeting ends in the chamber B of the furnace. The outer end of the tube or section D, which projects through the opposite side of the furnace to that on which the screw G is arranged, bears, either directly or indirectly, by a succession of welded sections, as shown in Fig. 2, against a thrust-piece or bar, F, united with the side of the furnace by rods *f f*, which are connected, by their heads and vertical guides *g g*, with the side of the furnace, said rods *g* having keyways *i* at different points throughout their length, to provide for adjusting the thrust-piece F to different distances from the side of the furnace, and for securing the same by keys $l$, to adapt the thrust-piece F to receive between it and the compressing-screw G different lengths or numbers of tubes or tubular sections D D, similarly united with each other in succession by welding. Other means of adjusting and securing the thrust-piece F on the rods $f$ may be substituted for the keys $l$ and keyways $i$. After each respective pair of tubes or tubular sections have been thus clamped, with their meeting ends exposed to the flame in the chamber B, said tubes, so situated, are heated to a welding-heat, and then pressure applied by the screw G, to weld said tubes together. This operation is repeated for each tubular section D added to the series. After welding, the sectionally-constructed tube is taken out of the furnace and hammered while hot, to reduce the swell produced in welding together the sections, as described.

The bar or thrust-piece F for the tubes, at the one side of the furnace, is perforated opposite said tubes, and said perforation, or the outer end of the outer tubular section on such side of the furnace, closed with mica or other transparent material, for the purpose, without admitting air, of ascertaining by sight when the tubular sections within the furnace have arrived at the proper heat to apply welding action or pressure to the screw G.

Power may be applied to the screw by means of a hand-wheel, I, or otherwise.

Instead of the screw G, any other suitable means may be used to produce the required compression—as, for instance, the plunger of a hydraulic press arranged within the frame E. Such, so far as this invention is concerned, is the equivalent of the screw.

In the operation, as hereinbefore described, the screw G, with the cap on its inner end, forms the compressor or follower of the welding apparatus, and the thrust-piece or bar F the abutment thereof. Such follower and abutment also constitute supports for the work outside of the furnace, and dispense with any mandrel for the work within the furnace; they also act as stoppers to exclude cold air from entering within the tube-sections and retarding the welding process.

I claim—

1. The combination, with the heating-chamber B of the furnace, having openings in its sides for reception and passage of the work, of the screw G, or equivalent compressing and welding device, on the one side of said chamber, and the thrust-piece or bar F on the opposite side thereof, essentially as described.

2. The thrust-piece F, made adjustable on or along the rods $f$ on the one side of the furnace, in combination with the welding-screw G on the opposite side of the furnace, substantially as specified.

COLIN TOLMIE.

Witnesses:
THEODORE TRAVIS,
CYRUS E. NELSON.